(12) United States Patent
Du

(10) Patent No.: US 6,785,253 B1
(45) Date of Patent: Aug. 31, 2004

(54) WIRELESS NETWORK WITH A CONCEALED NETWORK NODE

(75) Inventor: Yonggang Du, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/568,279

(22) Filed: May 10, 2000

(30) Foreign Application Priority Data

Dec. 5, 1999 (DE) .......................................... 199 21 716

(51) Int. Cl.[7] .......................... H04Q 7/24; H04L 12/28; H04J 3/06
(52) U.S. Cl. ...................... 370/338; 370/400; 370/509; 709/232
(58) Field of Search ................................ 370/254, 310, 370/328, 338, 349, 350, 400, 422, 420, 463, 512; 455/3.01, 502; 709/232, 238, 245; 375/356

(56) References Cited

U.S. PATENT DOCUMENTS 5,119,373 A * 6/1992 Fredricsson et al. ..... 370/85.15
5,369,784 A * 11/1994 Nelson ....................... 455/51.2

* cited by examiner

Primary Examiner—Duc Ho

(57) ABSTRACT

The invention relates to a wireless network with several network nodes which each comprise a radio device and of which one forms a transfer network node which is designed for the transmission of data between at least one concealed network node and all other network nodes. One of the network nodes forms a central network node for the control of the radio traffic. The central network node is designed for transmitting frame synchronization data for the formation of frames used in each radio device. The transfer network node serves for the exchange of certain data of the central network node with the concealed network node. The central network node is designed to carry out the exchange of the data between the transfer network node and concealed network nodes as regards the assignation of a sub-frame lying within a frame.

5 Claims, 3 Drawing Sheets

WIRELESS NETWORK WITH A CONCEALED NETWORK NODE

BACKGROUND OF THE INVENTION

The invention relates to a wireless network with several network nodes which each comprise a radio device, one of said nodes forming a transfer network node which is designed for the transmission of data between at least one concealed network node and all other network nodes.

Such a wireless network is known from the article "Code-Name Bluetooth" by Wolfgang Schulte, Funkschau 23, 1998, pp. 80 and 81. The wireless network is formed by several pico-networks which each comprise several network nodes. One of the nodes in a pico-network has a master function. All other nodes in a pico-network have a slave function. One of the nodes with slave function in such a pico-network serves to exchange data with a node of another pico-network.

SUMMARY OF THE INVENTION

The invention has for its object to provide a wireless network in which data are transmitted in a different manner from several directly accessible network nodes to a network node which is not accessible to all network nodes.

This object is achieved by means of a wireless network of the kind mentioned in the opening paragraph in that one of the network nodes forms a central network node for controlling the radio traffic, in that the central network node is designed for transmitting frame synchronization data for forming frames which are used in each radio device, in that the transfer network node is designed for exchanging certain data of the central network node with the concealed network node, and in that the central network node is designed for assigning a sub-frame present in a frame for the exchange of the data between the transfer network node and concealed network nodes.

The term "wireless transmission" is understood to refer to a radio, infrared, or ultrasound transmission, and the like. A transfer network node in the wireless network enables a concealed network node to supply data coming from a central network node and designed for the radio traffic in the wireless network. The transfer network node imitates the function of the central network node for the concealed network node. This is achieved in that a sub-frame in the MAC stage (MAC =Medium Access Control), which sub-frame lies in the MAC frame, is assigned. The data transmission is organized on the basis of the MAC frame and the sub-frame present in the MAC frame in a radio device of a network node.

In a first phase of the frame, the central network node transmits frame synchronization data, and it transmits control data in a second phase of the frame. The invention renders it possible for these data to be passed on to the concealed network node in that the transfer network node in a first phase of the sub-frame is designed for transmitting the frame synchronization data received from the central network node and in a second phase of the frame for transmitting certain control data received from the central network node.

Other aspects of the invention relate to further phases of the frame and sub-frame. The sub-frame is called initializing sub-frame before a concealed network node is included into the wireless network, and operational sub-frame after it has been included therein.

Still another aspect of the invention relates to a method for the wireless transmission of data between several network nodes which each comprise a radio device, and to a network node denoted central network node, and to a network node denoted transfer network node.

BRIEF DESCRIPTION OF THE DRAWINGS

Embodiments of the invention will now be explained in more detail with reference to the Figures, in which.

DETAILED DESCRIPTION OF THE INVENTION

Figure 1:
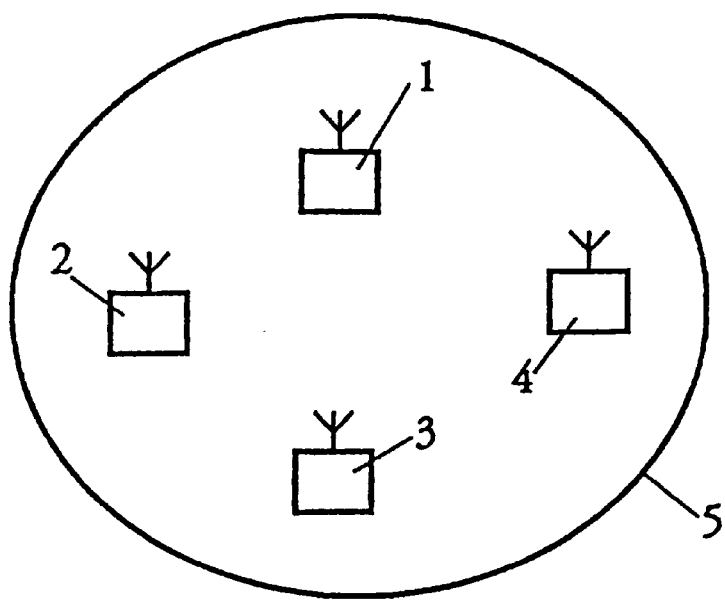
FIG. 1 shows a wireless network with several network nodes.

FIG. 1 shows a wireless network with several network nodes 1 to 4. The nodes 1 to 4 exchange data via radio links. The node 1, which has the function of a base station in a wireless network, is referred to as the central network node and controls the radio traffic in the wireless network. The nodes 2 to 4 are denoted normal network nodes and exchange data with one another and with the central network node. The range within which the central network node 1 can exchange data with the other nodes 2 to 4 is indicated with an ellipse 5 in FIG. 1.

A network node 1 to 4 comprises at least a radio device which establishes respective radio connections to other network nodes, and possibly to other operational devices. Such devices may be, for example, a video codec, a video recorder, a monitor, a tuner, a CD player, etc. The radio device, which is known per se, comprises an interface circuit, a protocol device, a modem, a high-frequency circuit, and an antenna. The interface circuit exchanges data, possibly after a format adaptation, between the protocol device and the other devices of a network node 1 to 4. The high-frequency circuit transmits data received from the antenna via the modem to the protocol device. Furthermore, the antenna transmits data originating from the protocol device and passed on by the modem and the high-frequency circuit.

The protocol device, which is formed, for example, as a processor system, forms packet units from the data supplied by the interface circuit or data which can be processed by the interface circuit from the packet units supplied by the modem. One packet contains not only the received data but also additional control information created by the protocol device. The protocol device unitizes protocols for the LLC stage (LLC =Logical Link Control) and the MAC stage (MAC =Medium Access Control). The MAC stage controls the multiple access of a radio device to the radio transmission medium, and the LLC stage carries out a traffic flow and error check.

In the wireless network of FIG. 1, the data may be exchanged between the network nodes 1 to 4 in accordance with a TDMA, FDMA, or CDMA method (TDMA =Time Division Multiplex Access, FDMA =Frequency Division Multiplex Access, CDMA =Code Division Multiplex Access). The methods may also be combined. Data are transmitted in certain assigned channels. A channel is defined by a frequency range, a time period, and, for example in the case of a CDMA method, a spreading code.

Figure 2:
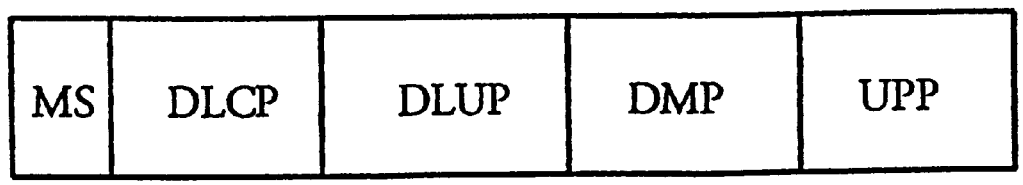
FIG. 2 shows an MAC frame used in the wireless network of FIG. 1.

The data transmission is organized in frames in the MAC stage of a network node 1 to 4. This frame comprises several time slots for radio synchronization data, control data, and payload data, and is denoted MAC frame. In the centrally controlled wireless network shown in FIG. 1, the central network node 1 is in charge of the radio synchronization and also of the dynamic time slot assignment in the MAC frame for the normal network nodes 2 to 4. FIG. 2 shows such an MAC frame. Each MAC frame has at its beginning a frame synchronization preamble MS in which frame synchronization data are generated by the central network node 1. The frame synchronization phase or preamble MS is followed by a downlink control phase DLCP in which control data are sent by the central network node 1 to the normal network nodes 2 to 4, and a downlink user phase DLUP, in which payload data are sent by the central network node 1 to the normal network nodes 2 to 4. The downlink user phase DLUP is followed by a direct mode phase DMP in which the normal network nodes 2 to 4 exchange control and payload data with one another. In the final phase, the uplink phase UPP, the normal network nodes 2 to 4 send control and payload data to the central network node 1 over a dedicated channel or a random access channel.

The MS, DLCP, DLUP, DMP, and UPP phases each comprise one or several time slots (channels). The length of the phases and also of the time slots may be fixedly programmed or variable. In the latter case, the central network node 1 determines the lengths of the phases and the time slots in dependence on the relevant requirements in the wireless network.

A dedicated channel is a point-to-point link between two network nodes. A random channel may be formed by one or several time slots through which the respective data are transmitted by normal network nodes 2 to 4. In this case the central network node 1 does not lay down the moment in time for the access of a normal network node 2 to 4 to the random channel. The random channel may be used by a normal network node 2 to 4, for example for a registration request.

In the DLCP phase, the central network node 1 can send a message to all normal network nodes 2 to 4. The messages indicates which time slots the normal network nodes 2 to 4 are allowed to use for transmitting their data in the DMP and/or UPP phases. The central network node 1 may also send a message to all normal network nodes 2 to 4 during the DLCP phase to notify the normal network nodes 2 to 4 which of the time slots are used in the DLUP phase for receiving payload data from the central network nodes 1 and/or which of the time slots are used in the DMP phase for receiving control and payload data from other normal network nodes 2 to 4. In addition, the central network node 1 utilizes the DLCP phase for informing the normal network nodes 2 to 4 of the position of a random access channel RACH. As was noted above, the random access channel RACH is generally used for registering new normal network nodes in the network. After the registration, a normal network node may then use the UPP phase for requesting one or several time slots by means of a message to the central network node 1. A message is then also sent to the central network node in which the quantity of data is indicated which the normal network node wishes to transmit.

Figure 3:
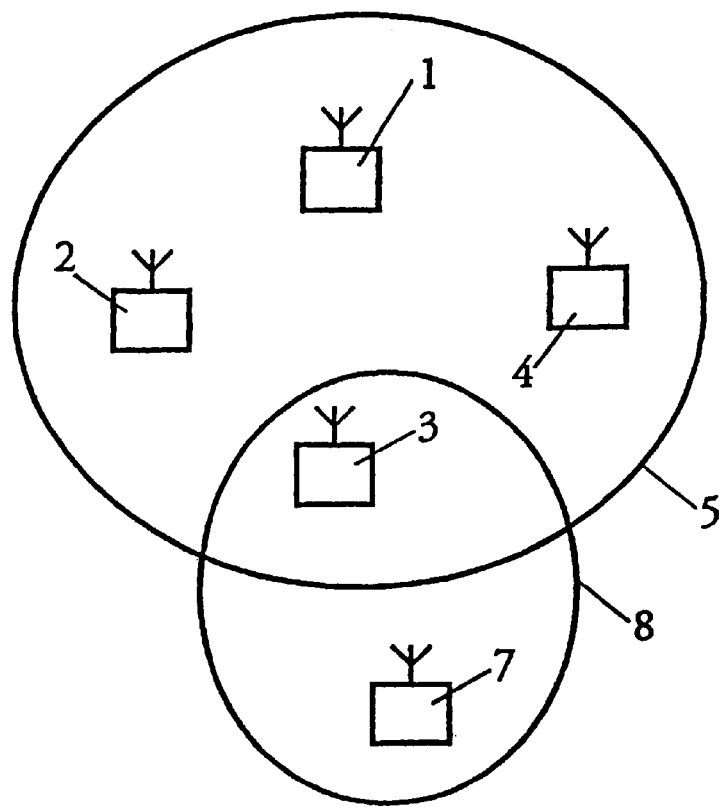
FIG. 3 shows a wireless network with several network nodes, one of which forms a concealed network node.

In the wireless network shown in FIG. 1, all normal network nodes 2 to 4 can receive control and payload data from the central node 1. FIG. 3 shows a further wireless network which comprises not only the central node 1 and the normal network nodes 2 to 4, but also a node 7 which is denoted concealed network node. The network node 7 is called a concealed network node because it can exchange data with one normal network node (i.e. node 3 in FIG. 3) only, but not with the central network node 1. This is indicated in FIG. 3 by means of a further ellipse 8 which encircles the network nodes 3 and 7.

The normal network node 3 has the function of transmitting data from the central network node 1 and other normal network nodes 2 to 4 to the concealed network node 7 and data from the concealed network node 7 to the central network node 1 and all other normal network nodes 2 to 4. Such a normal network node 3, which exchanges data with a concealed network node (for example node 7), is seen as an emulated central network node by the concealed network node.

Figure 4:
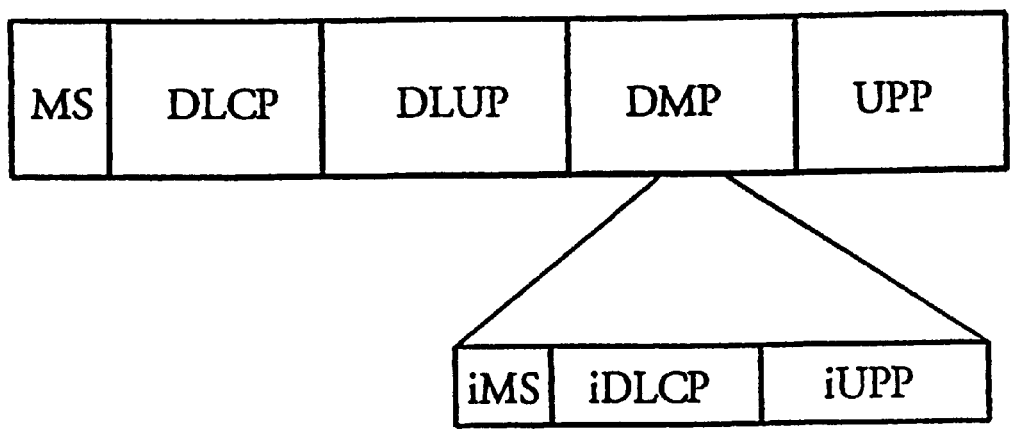
FIGS. 4, 5, and 6 show MAC frames used in the wireless network of FIG. 3 and each comprising a sub-frame.

To include a concealed network node 7 which has no direct radio contact with the central network node 1, a special sub-frame is provided in the MAC frame during certain time periods, which sub-frame is denoted initializing sub-frame before the inclusion. During the active period of the initializing sub-frame, the frame synchronization data and some control data are supplied by the central network node 1 to the concealed network node 7 via the selected network node 3. This initializing sub-frame is dynamically determined by the central network node during a DMP and/or UPP phase. FIG. 4 shows an MAC frame and an initializing sub-frame. The initializing sub-frame consists of a frame synchronization phase iMS, a downlink control phase iDLCP, and an uplink phase iUPP. During the iMS phase, the frame synchronization data are repeated by the special node (for example network node 3), and some control data of the central network node are passed on during the iDLCP phase. The iUPP phase only comprises a random access channel iRACH in which a not yet included concealed network node (for example node 7) can transmit a request for inclusion into the wireless network.

The request for inclusion issued by the concealed network node 7 is received as a message by a selected network node 3 during the iUPP phase of the initializing sub-frame. The selected network node 3 passes on the message with the inclusion request to the central network node 1 during the next UPP phase of the MAC frame, which does not form part of the initializing sub-frame. If the central network node 1 grants the inclusion request of the concealed network node 7, the starting position of the next sub-frame is laid down. This next sub-frame is denoted the operational sub-frame, i.e. after the inclusion. This starting point in relation to the MAC frame always has the same position for all subsequent operational sub-frames up to the moment when the concealed network node 7 leaves the wireless network. The length of the operational sub-frame is variable and is determined by the central network node 1 in dependence on the quantity of data to be transmitted. The normal network node 3 selected by the concealed network node 7 becomes a transfer node upon the start of the first operational sub-frame.

Figure 5:
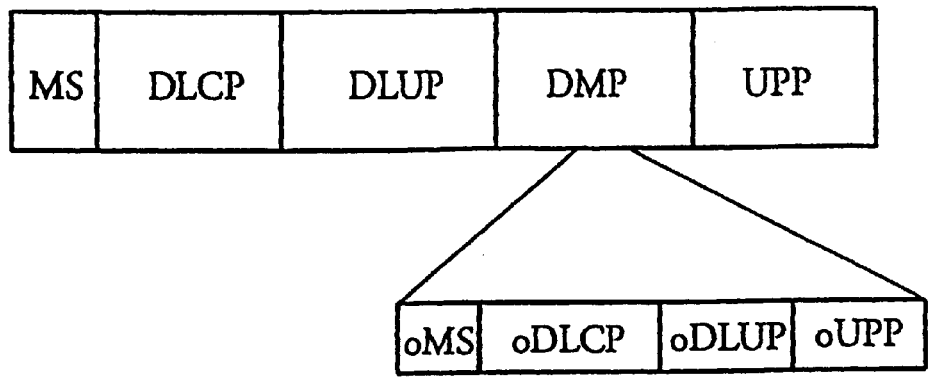

The operational sub-frame comprises a frame synchronization phase oMS and a downlink control phase oDLCP (FIG. 5). In addition, the operational sub-frame may also comprise a downlink user phase oDLUP and an uplink phase oUPP. The transfer network node 3 continuously repeats the frame synchronization data received from the central network node 1 during the oMS phase, and all control data of the central network node 1 which are relevant to the concealed network node 7 in the oDLCP phase of the operational sub-frame. For example, the message sent by the central network node 1 on the assignation of a time slot for the concealed network node 7 is repeated during the oDLCP phase as control data for the transfer network node 3.

The concealed network node 7 may use a random access channel oRACH during the oUPP phase so as to apply for a point-to-point (or unicast) connection, or a multicast connection in the wireless network via a dedicated channel. A point-to-point connection through a dedicated channel from the concealed network node 7 to any other network node 1 to 4 is denoted a dedicated uplink channel of the concealed network node 7 and is written as uplink channel oUDCH for short. The uplink channel oUDCH forms part of the oUPP phase of the operational sub-frame, as does a random access channel oRACH. The central network node 1 transmits control data with a message on an assignation of such an uplink channel oUDCH during the DLCP phase of the MAC frame. The transfer node 3 passes on these control data to the concealed network node 7 during the oDLCP phase of the operational sub-frame. The central network node 1, however, must not only assign one or several time slots for the uplink channel oUDCH (uplink dedicated channel) in the operational sub-frame, but also respective time slots in a DMP phase and/or a UPP phase of the MAC frame. These corresponding time slots lying outside the operational sub-frame are required by the transfer node 3 for transmitting data from the concealed network node 7 to one or several other nodes 1 to 4 through the transfer node 3. These time slots belong to a channel which is denoted the uplink channel UDCH by analogy to the uplink channel oUDCH of the operational sub-frame.

If payload data are to be sent from a normal network node 2 to 4 and/or the central network node 1 to the concealed network node 7, the central network node 1 must assign a dedicated downlink channel oDDCH in the oDLUP phase of the operational sub-frame. This downlink channel oDDCH is used for the transmission of payload data from the transfer node 3 to the concealed network node 7. A corresponding downlink channel must again be assigned in the MAC frame in the DMP or UPP phase outside the operational sub-frame by the central network node 1 for the connection between one or several network nodes 1, 2 and 4 and the transfer node 3.

Figure 6:
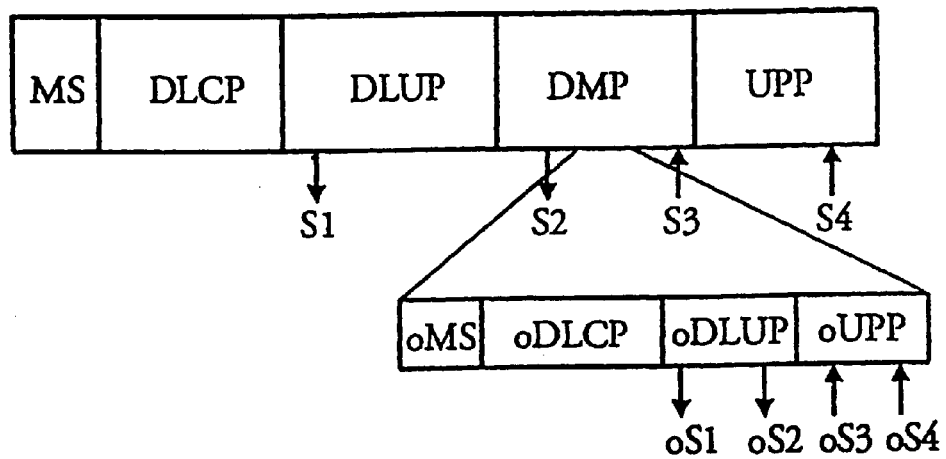

An example of time slots in the operational sub-frame assigned by the central network node 1 is shown in FIG. 6. Two time slots oS1 and oS2 have been assigned as downlink channels oDDCH in the oDLUP phase of the operational sub-frame by the central network node 1. Corresponding time slots or downlink channels S1 and S2 are present in the DLUP and DMP phases. Payload data, for example originating from a normal network node (for example node 2), are transmitted in the time slot S1 or S2 to the transfer node 3 and therefrom to the concealed network node 7 in the time slot oS1 or oS2.

For the reverse transmission direction, two time slots oS3 and oS4 have been assigned by the central network node 1 as uplink channels oUDCH in the operational sub-frame. Corresponding time slots S3 and S4 are contained as uplink channels UDCH in the DMP and UPP phases of the MAC frame outside the operational sub-frame. In the time slot oS3 or oS4, the concealed network node 7 transmits data to the transfer network node 3, which passes on these data to, for example, a normal network node during the time slots S3 or S4.

It should be noted that data can be exchanged between the transfer node 3 and the concealed network node 7. In such a case the assignation of time slots in the MAC frame is not necessary, an assignation of time slots in the operational sub-frame suffices.

What is claimed is:

1. A wireless network with several network nodes which each comprise a radio device, one of said nodes forming a transfer network node which is designed for the transmission of data between at least one concealed network node and all other network nodes, wherein one of the network nodes forms a central network node for controlling the radio traffic, in that the central network node is designed for transmitting frame synchronization data for forming frames which are used in each radio device, in that the transfer network node is designed for exchanging certain data of the central network node with the concealed network node, and in that the central network node is designed for assigning a sub-frame present in a frame for the exchange of the data between the transfer network node and concealed network nodes, wherein the central network node is designed for transmitting frame synchronization data during a first phase of the frame and for transmitting control data during a second phase of the frame, and in that the transfer network node is designed for transmitting the frame synchronization data received from the central network node during a first phase of the sub-frame, and for transmitting certain control data received from the central network node during a second phase of the frame.

2. A wireless network as claimed in claim 1, wherein the central network node is designed for transmitting payload data to at least one other network node during a third phase of the frame, in that the transfer network node is designed for exchanging data with the concealed network node during a fourth and/or fifth phase of the frame, and in that during the fourth phase of the frame not occupied by the sub-frame other network nodes are designed for exchanging payload data with one another, and during the fifth phase not occupied by the sub-frame at least one other network node is designed for transmitting payload data to the central network node.

3. A wireless network as claimed in claim 1, wherein before a concealed network node is included into the wireless network, the concealed network node is designed for receiving a message on an inclusion request of the concealed network node.

4. A wireless network as claimed in claim 1, wherein after a concealed network node has been included into the wireless network, the transfer network node is designed for transmitting payload data during a third phase of the sub-frame and for receiving control and/or payload data of the concealed network node during a fourth phase of the sub-frame.

5. A method for the wireless transmission of data between several network nodes which each comprise a radio device, one of said network nodes forming a transfer network node which transmits data between at least one concealed network node and all other network nodes, wherein one of the network nodes acting as a central network node controls the radio traffic and transmits frame synchronization data from which frames are formed in each radio device, in that the transfer network node exchanges certain data of the central network node with the concealed network node, and in that the central network node assigns a sub-frame lying within a frame for the exchange of the data between the transfer network node and concealed network nodes, wherein the central network node is designed for transmitting frame synchronization data during a first phase of the frame and for transmitting control data during a second phase of the frame, and in that the transfer network node is designed for transmitting the frame synchronization data received from the central network node during a first phase of the sub-frame, and for transmitting certain control data received from the central network node during a second phase of the frame.

* * * * *